Nov. 17, 1970 — D. A. THOMAS — 3,540,303

GEAR SHIFT MECHANISM

Filed Jan. 24, 1969 — 2 Sheets-Sheet 1

INVENTOR
Dalton A. Thomas
BY Jennings, Carter & Thompson
Attorneys

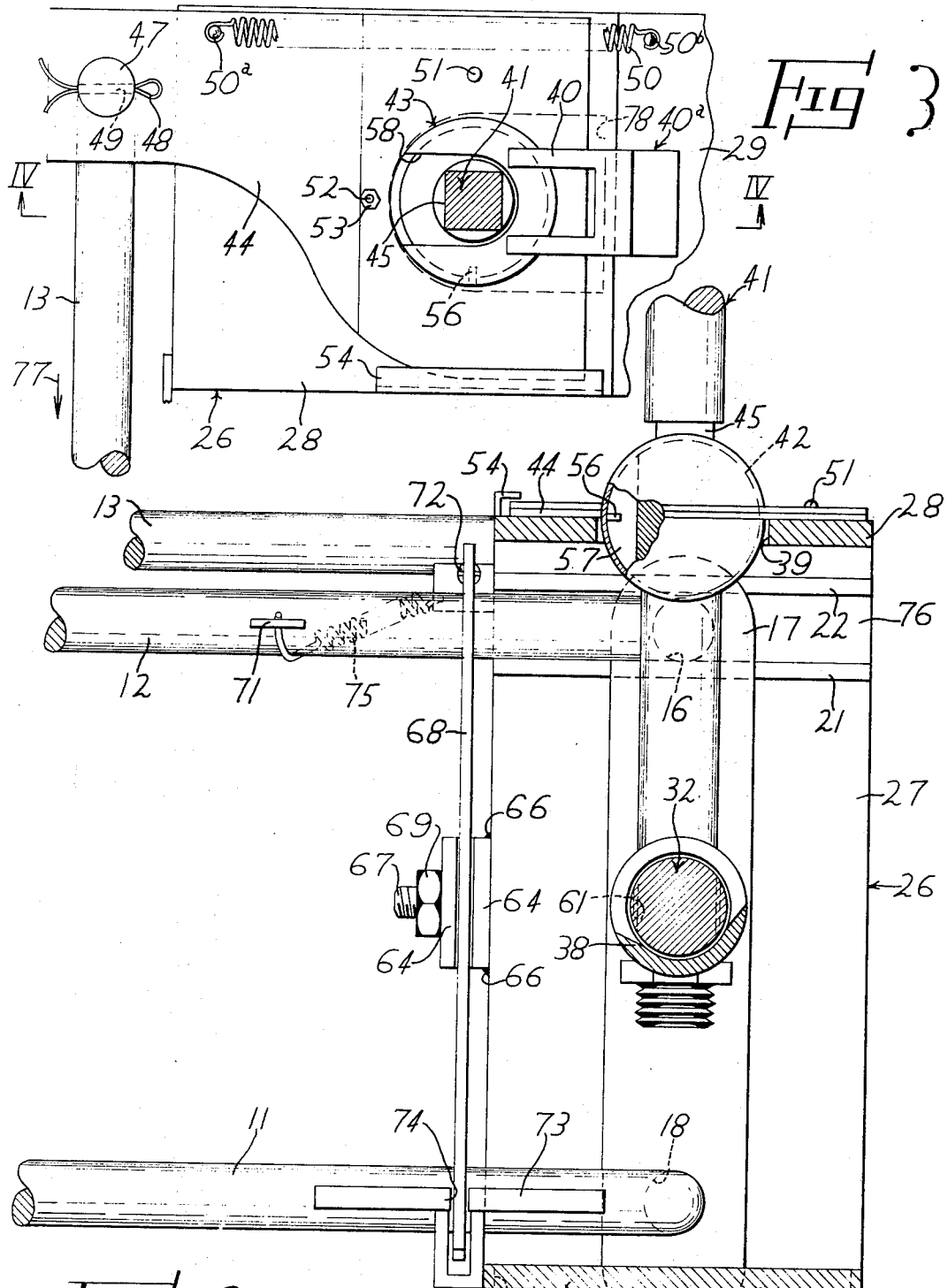

United States Patent Office 3,540,303
Patented Nov. 17, 1970

3,540,303
GEAR SHIFT MECHANISM
Dalton A. Thomas, Rte. 1, Box 97,
Alpine, Ala. 35014
Filed Jan. 24, 1969, Ser. No. 793,693
Int. Cl. G05g 9/02
U.S. Cl. 74—477                    5 Claims

ABSTRACT OF THE DISCLOSURE

Shifting apparatus for transmission actuating members pivoted to the ends of a bar with a shift member connected to and extending laterally from an intermediate portion of bar for moving the bar in a direction perpendicular to its length to a first position and a second position. Lateral projection on one actuating member is engaged by a first holding element upon movement of bar to said first position. A second holding element operates in response to movement of said bar to said first position to release other actuating member and in response to movement of said bar to said second position to hold said other actuating member against longitudinal movement.

CROSS REFERENCE TO RELATED APPLICATION

This invention relates to gear shift mechanism and is an improvement over the apparatus disclosed and claimed in my copending application Ser. No. 661,858, filed Aug. 21, 1967 and entitled "Gear Shift Mechanism."

BACKGROUND OF THE INVENTION

As is well known in the art to which my invention relates difficulties have been ecountered in changing gears of transmissions, such as the gears of an automotive vehicle, quickly and smoothly. This difficulty in changing the gears results in considerable loss of power and time as the transmission is placed in different drive settings. Apparatus of various types have been proposed for shifting gears by straight line motion of the gear the shift lever. However, with such apparatus, it is necessary to actuate other mechanisms in order to lock one actuating member in place while the other actuating member is moved to different drive settings. Also, it is necessary to employ other mechanism in combination with the gear shift lever to place the transmission in different drive settings.

BRIEF SUMMARY OF THE INVENTION

With my present invention, the transmission may be placed in different drive settings by employing a single gear shift lever without the use of other actuating mechanisms outwardly of the gear shifting housing. The transmission is placed in different drive settings by straight line motion of the gear shift lever without the necessity of actuating other locking mechanism. A shift member is connected to and extends laterally from an intermediate portion of a bar which is connected at opposite ends to transmission actuating members. The shift member moves the bar in a direction perpendicular to its length to a first position and a second position whereby a lateral projection carried by one actuating member is engaged by a first retaining element upon movement of the bar to the first position. A second retaining element operates upon movement of the bar to its first position to release the other actuating member and retain said other actuating member against longitudinal movement in response to movement of the bar to said second position.

Apparatus embodying features of my invention is illustrated in the accompanying drawings, forming a part of this application, in which:

FIG. 2 is a sectional view taken generally along the line 2—2 of FIG. 1;

Figures 1, 4:
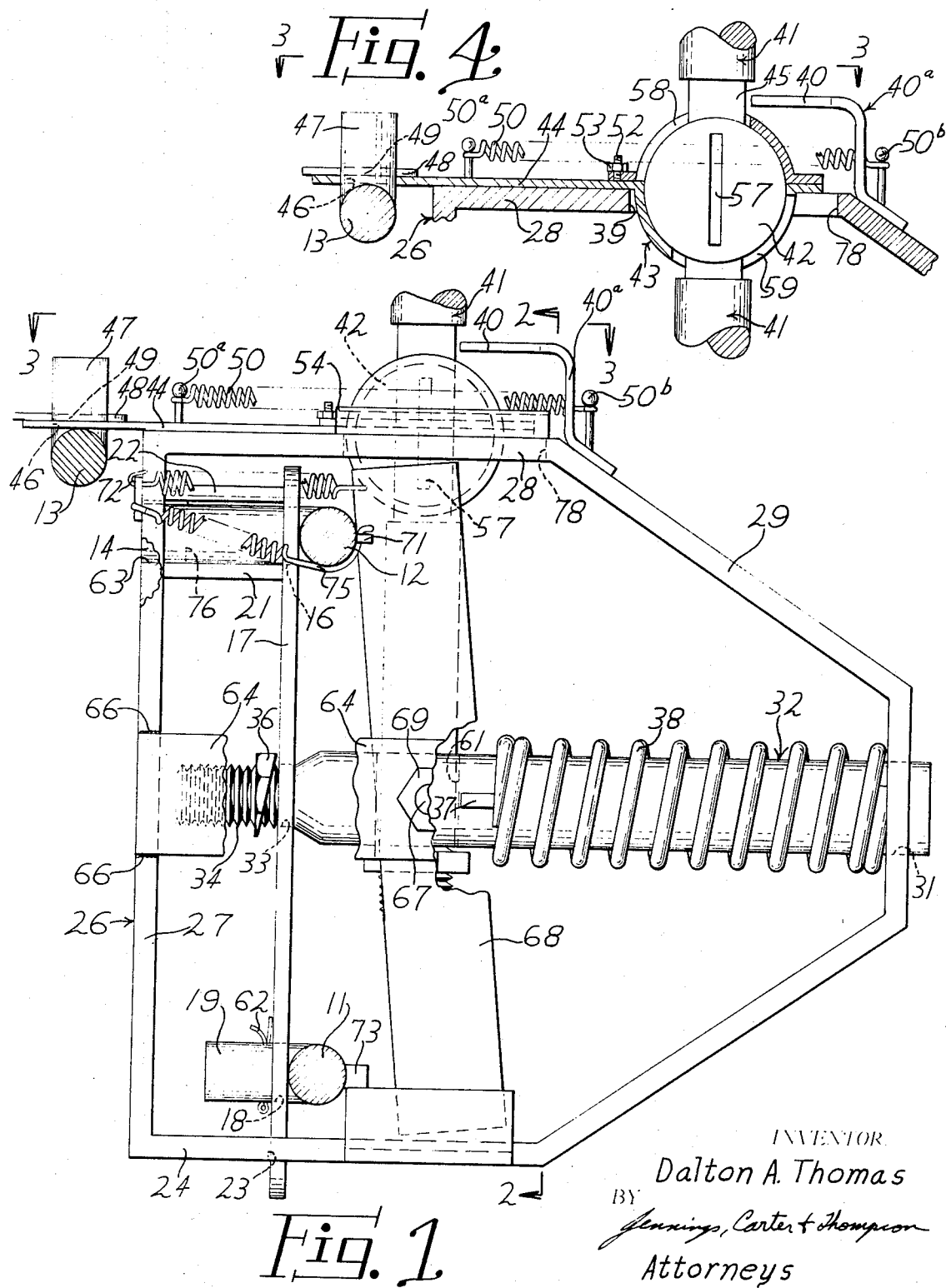
FIG. 1 is a side elevational view, partly broken away and in section.

FIG. 3 is a fragmental, sectional view taken generally along the line 3—3 of FIGS. 1 and 4; and, FIG. 4 is a sectional view taken generally along the line 4—4 of FIG. 3.

Referring now to the drawings for a better understanding of my invention, I show actuating members 11 and 12 which are connected to the usual actuating arms carried by a transmission, such as an automotive transmission. I also show another actuating member in the form of a link 13 which is operatively connected to the usual operating arm for placing the transmission in reverse drive setting. While I have shown actuating members 11, 12 and 13 for use with a conventional type four speed transmission having a separate arm for placing the transmission in reverse drive setting, it will be apparent that the apparatus is also adapted for use with three-speed trnsmission. Accordingly, when my invention is employed with a three-speed transmission the reverse mechanism just described is not necessary. The actuating members 11, 12 and 13 are conventional type link members which are connected to the transmission for placing the transmission in different drive settings.

My improved apparatus for operating the actuating members 11 and 12 will now be described. A depending, lateral projection 14 is carried by the free end of actuating member 12 in position to extend through an opening 16 provided adjacent one end of an elongated member 17. An opening 18 is provided adjacent the other end of the elongated member 17 for receiving a depending, lateral projection 19 carried by the free end of actuating member 11. As shown in FIGS. 1 and 2, the end of the elongated member 17 having the opening 16 therein mounted for sliding movement along the edges of horizontally extending guide members 21 and 22 which are spaced vertically from each other, as shown. The end of the elongated member 17 having the opening 18 therein extends through an elongated opening 23 provided in a horizontal bottom plate 24 of a housing unit indicated generally at 26. The bottom plate 24 is formed integrally with a vertical plate 27 which in turn is connected to a horizontal top plate 28. The bottom plate 24 and the top plate 28 are connected to each other at the side thereof opposite the vertical plate 27 by a generally U-shaped member 29.

As shown in FIG. 1, the U-shaped member 29 is provided with a centrally disposed opening 31 therein for receiving one end of a shift member 32 with a sliding fit. The other end of the shift member 32 extends through a centrally disposed opening 33 provided in the elongated member 17. The end of the shift member 32 projecting from the elongated member 17 is threaded as at 34 for receiving a retaining nut 36 whereby the elongated member 17 moves in a direction perpendicular to its length upon axial movement of the shift member 32. The nut 36 is provided with a sloping side adjacent member 17 which slopes away from actuating member 12, as shown causing the end of member 17 connected to actuating member 12 to move first upon moving member 17 toward the right as viewed in FIG. 1. Surrounding the elongated shift ember 32 intermediate the inner surface of the U-shaped member 29 and a stop memebr 37 is a compression spring 38 which urges the shift member 32 toward the left, as viewed in FIG. 1.

The top 28 of the housing 26 is provided with an opening 39 therethrough for receiving a gear shift lever 41. As shown in FIG. 4, a ball 42 is carried by the shift lever 41 in position to engage a socket housing 43 carried by the top plate 28 and positioned within the opening 39, as shown. Also, as shown in FIG. 4, the socket housing 43 is formed integrally with a laterally projecting bracket 44. An opening 46 is provided in the bracket 44 for receiving a laterally projecting end portion 47 of the link 13. A cotter pin 48 passes through a suitable opening 49 in the laterally extending portion 47 whereby the link 13 is pivotally connected to the bracket 44.

As shown in FIG. 3, the bracket 44 is pivotally connected to the top plate 28 by a pivot pin 51. Preferably, the socket 43 is made in two parts which are secured to each other by suitable means, such as a stud 52 having a retaining nut 53. An elongated guide bracket 54 is secured to the top plate 28, as shown in FIGS. 1, 2 and 3 to restrain outward movement of the adjacent side of the bracket 44. An inwardly projecting member 56 is carried by the inner surface of the socket housing 43 in position to extend inwardly of a vertical slot 57 provided in the ball 42 and restrain rotation of the ball 42 relative to the rocket housing 43. Arcuate openings 58 and 59 are provided in the socket housing 43, as shown in FIG. 4, to permit pivotal movement of the ball 42 and the gear shift lever 41 carried thereby in a counterclockwise direction from the position shown in FIG. 4. An opening 61 is provided through the elongated shift member 32 for receiving the lower end of the shift lever 41 whereby upon pivoting the gear shift lever 41 in a counterclockwise direction, as viewed in FIG. 4, the lower end of the lever 41 moves toward the right, as viewed in FIG. 1 to compress spring 38 and at the same time move the elongated member 17 in a direction perpendicular to its length. That is, the elongated member 17 moves away from the vertical wall 27 of housing 26. A suitable cotter pin 62 is carried by the lateral projection 19 whereby the actuating member 11 is held against separation from the elongated member 17.

As shown in FIG. 1, the vertical plate 27 is provided with an opening 63 therethrough for receiving the free end of the lateral projection 16 carried by actuating member 12 whereby the adjacent end of the elongated member 17 is adapted to pivot about projection 14 so long as the projection 14 extends inwardly of opening 63. That is, opening 63 prevents longitudinal movement of the actuating member 12 to oppositely disposed drive settings.

As shown in FIGS. 1 and 2, a support bracket 64 is secured to the side of the vertical plate 27 as by welding at 66. Preferably, the brackets 64 is generally U-shaped with the base of the U being adjacent the vertical plate 27 and the legs of the U-shaped bracket 64 extending generally parallel to the shift member 32. Extending between the legs of the U-shaped bracket 64 and pivotally connected thereto by a bolt-like member 67 is an elongated arm 68 which is adapted to extend across the actuating members 11 and 12, as shown in FIGS. 1 and 2. The bolt-like member 67 is secured in place by a nut 69.

As shown in FIGS. 1 and 2, a spring attachment member 71 is carried by the actuating member 12 in position to engage the adjacent end of a tension spring 75 which urges the actuating member 12 toward the right as viewed in FIG. 2. A tension spring 72 is interposed between the vertical wall 27 and the end of the arm 68 adjacent the actuating member 12, as shown in FIG. 1, whereby that end of the arm 68 engages the actuating member 12 and urges the lateral projection 14 into the opening 63 while the mechanism is in neutral position. An elongated member 73 having a centrally disposed notch 74 therein is mounted at a side of the actuating member 11 in position to engage the adjacent end of arm 68 when it is pivoted toward the actuating member 11. The notch 74 is of a size to receive the adjacent end of arm 68, as shown in FIG. 2.

From the foregoing description, the operation of my improved gear shift mechanism will be readily understood. To move the transmission from a neutral position to a drive setting corresponding to first gear, the shift lever 41 is pivoted in a counterclockwise direction, as viewed in FIG. 1 whereupon the shift member 32 is moved axially to the right, as viewed in FIG. 1 to thus move the elongated member 17 perpendicular to its length whereby the lateral projection 14 moves out of engagement with the opening 63 and is moved to the right whereupon it is in position to ride over a block 76 carried by the vertical plate 27 in alignment with the opening 63. As shown in FIG. 2, the block 76 is mounted between the guide members 21 and 22 and extends from a position adjacent the opening 63 to one side of the vertical plate 27, as shown. With the end of the lateral projection 14 at a position to pass over the blocks 76, the upper end of the shift lever 41 is pivoted forward or to the left, as viewed in FIG. 2 whereupon the lower end of the lever 41 moves toward the right, as viewed in FIG. 2 to thus move the lateral projection 14 over the block 76. As the lateral projection 14 is moved to the right, as shown in FIG. 1, to a position to pass over the block 76, the actuating member 12 engages the adjacent end of arm 68 whereupon the arm 68 is pivoted about bolt 67 to a position with the opposite end of arm 68 engaging the notch 74. The notch 74 holds the actuating member 11 against longitudinal movement as the lateral projection 14 and actuating member 12 are moved longitudinally to position the transmission in first gear.

To place the transmission in second gear, the shift lever 41 is moved rearwardly or toward the right, as viewed in FIG. 2 whereupon the lateral projection 14 passes over the opening 63 and continues to ride between the guide members 21 and 22 to the second gear setting. Back pressure or resistance from the transmission will cause the lateral projection 14 to engage the elongated member 17 whereby the actuating member 12 bears against the arm 68 to thus hold actuating member 11 in neutral position as actuating member 12 is moved to the second gear setting. That is, as the elongated actuating member 12 is moved longitudinally to first and second gear settings, the elongated member 17 pivots about the lateral projection 19. Upon release of the shift lever 41, the compression spring 38 causes the shift member 32 to move toward the left, as viewed in FIG. 1, thus releasing arm 68 from the notch 74.

To place the transmission in third gear, the shift lever 41 is moved forwardly or toward the left, as viewed in FIG. 2. The transmission will hold the actuating member 11 from moving until the actuating member 12 is brought into neutral position, whereupon lateral projection 14 drops into opening 63, due to the force exerted by the tension spring 72. Continued forward movement of the shift lever 41 pivots the elongated member 17 about the projection 14, thus moving actuating member 11 to the third gear setting.

To place the transmission in fourth gear, the gear shift lever 41 is pulled rearwardly, or toward the right, as viewed in FIG. 2, whereupon the elongated member 17 pivots about the lateral projection 14 thus moving the actuating member 11 forward to the fourth gear setting.

To place the transmission in reverse, the shift lever 41 is placed in neutral position and is then pushed toward the right, as viewed in FIG. 3 whereupon the bracket 44 pivots about pivot pin 51 in a counterclockwise direction to thus move the link 13 in the direction of the arrow 77 which places the transmission in the reverse gear setting. As clearly shown in FIG. 4, an elongated slot or opening 78 is provided in the top plate 28 to permit the ball joint housing 43 and the bracket 44 secured thereto to move as a unit about the pivot pin 51. A U-shaped member 40 is formed integrally with a bracket 40a which is secured to housing 26, as shown. Member 40 is provided with parallel legs which are in position to engage a square portion 45 of the gear shift lever 41 upon movement of lever 41 to the right, as viewed in FIGS. 1, 3 and 4, thus assuring that the transmission is placed in reverse gear only. A tension spring 50 is connected to bracket 44 at 50a and to housing 26 at 50b to retain bracket 44 and its link 13 out of reverse setting until lever 41 is moved to the right as viewed in FIGS. 1, 3 and 4. Upon movement of link 13 to reverse setting spring 50 passes beyond pivot pin 51 whereupon spring 50 then aids in holding link 13 in the reverse setting.

From the foregoing, it will be seen that I have devised an improved gear shift mechanism which moves in a straight line direction as the gear drive settings are changed. By operatively connecting the lower end of the gear shift lever to the elongated shift member which moves axially in a direction perpendicular to the elongated member 17 connected thereto, the elongated member 17 is moved to selected positions to thus disengage the lateral projection 14 from the opening 63 without the necessity of additional mechanism outwardly of the apparatus housing. Accordingly, a single gear shift lever projects outwardly of the housing 26 and is adapted to move the actuating members 11, 12 and 13 to their operating positions.

While I have shown my invention in but one form, it will be obvious to those skilled in the art that it is not so limited, but is susceptible of various other changes and modifications without departing from the spirit thereof.

What I claim is:

1. In a transmission having two actuating members operatively connected thereto with each being shiftable longitudinally from an intermediate position corresponding to a neutral setting to either of two oppositely disposed positions respectively placing the transmission in different drive settings, means for shifting said actuating members comprising:
   (a) a lateral projection carried by one of said actuating members,
   (b) an elongated member pivotally connected adjacent one end thereof to said lateral projection with said projection extending outwardly thereof,
   (c) means pivotally connecting the other end of said elongated member to the other of said actuating members,
   (d) a shift member connected to and extending laterally from said elongated member intermediate the pivotal connections of said elongated member to said actuating members and disposed to move said elongated member and said lateral projection connected thereto in a direction generally perpendicular to said elongated member to a first position and a second position,
   (e) a first releasable restraining element disposed to engage said lateral projection and hold said one actuating member against longitudinal movement upon movement of said lateral projection to said first position and disposed to release said lateral projection upon movement thereof to said second position to permit longitudinal movement of said one actuating member to said oppositely disposed positions,
   (f) a second releasable restraining element operable in response to movement of said lateral projection to said one position to release said other actuating member for longitudinal movement to said oppositely disposed positions and operable in response to movement of said lateral projection to said second position to hold said other actuating member against longitudinal movement, and
   (g) a shift lever operatively connected to said shift member to move said elongated member selectively to said first position and said second position and to positions to move said actuating member selectively from said neutral setting to said oppositely disposed positions.

2. The combination defined in claim 1 in which said shift member is an elongated member extending generally perpendicular to and operatively connected to said shift lever.

3. The combination defined in claim 2 in which said elongated member is provided with an opening therethrough for receiving said shift member with a rotating fit and means is carried by said shift member at opposite sides of said elongated member limiting axial movement of said shift member relative to said elongated member.

4. The combination defined in claim 2 in which a spring member urges said shift member and said elongated member toward said one position.

5. The combination defined in claim 1 in which said shift lever is pivotally connected intermediate its ends to a supporting housing by a ball and socket-like joint with said ball secured to said lever and means is interposed between said ball and its socket to limit rotating of said ball and the shift lever secured thereto.

References Cited

UNITED STATES PATENTS

| | | | |
|---|---|---|---|
| 2,265,378 | 12/1941 | Lawler | 74—477 |
| 3,264,894 | 8/1966 | Popovich et al. | 74—477 |

MILTON KAUFMAN, Primary Examiner

U.S. Cl. X.R.

74—476